United States Patent Office 3,595,939
Patented July 27, 1971

3,595,939
PROCESS FOR THE PRODUCTION OF VINYL CHLORIDE/VINYL ALCOHOL COPOLYMERS
Marvin Koral, Warren, Elliott Farber, Trenton, and Christian W. Johnston, Belle Mead, N.J., assignors to Tenneco Chemicals, Inc.
No Drawing. Filed Dec. 27, 1968, Ser. No. 787,588
Int. Cl. C08f 27/14
U.S. Cl. 260—871  10 Claims

ABSTRACT OF THE DISCLOSURE

Heat-stable vinyl chloride/vinyl alcohol copolymers are prepared by heating a vinyl chloride/vinyl acetate copolymer in suspension in a lower alkanol that contains a strong acid catalyst until most or all of the acetate groups have been converted to alcohol groups and treating the recovered copolymer with, for example, calcium hydroxide, to neutralize the acid that is present in it.

---

This invention relates to a process for the production of vinyl chloride/vinyl alcohol copolymers. More particularly, it relates to a process for the production of vinyl chloride/vinyl alcohol copolymers that are characterized by excellent heat stability, color, clarity, adhesion, and other valuable properties.

Copolymers of vinyl chloride and vinyl alcohol are usually prepared by alcoholizing the corresponding vinyl chloride/vinyl acetate copolymers with a lower alkanol in the presence of a solvent and a strong acid catalyst, such as sulfuric acid, ethylsulfuric acid, or p-toluenesulfonic acid. The alcoholysis is generally carried out with the copolymer in solution in tetrahydrofuran, acetone, cyclohexanone, or a mixture of these solvents. The alcoholyzed copolymer is then precipitated from the solution, neutralized and dried.

In accordance with this invention, it has been found that when the alcoholysis of vinyl chloride/vinyl acetate copolymers is carried out in a suspension in a lower alkanol the process is simpler and more economical to operate than the aforementioned solution process. In the process of this invention a suspension is formed in which the dispersed phase is a finely-divided vinyl chloride/vinyl acetate copolymer and the continuous phase comprises a lower alkanol, such as methanol, ethanol, or isopropanol, and a strong acid catalyst. This suspension is heated until the desired degree of conversion of the vinyl chloride/vinyl acetate copolymer to a vinyl chloride/vinyl alcohol copolymer has been effected. In this process the lower alkanol serves as both the alcoholyzing agent and the continuous phase of the suspension.

The process of this invention in which the alcoholysis of vinyl chloride/vinyl acetate copolymers is carried out in a heterogeneous system provides a number of advantages over the previously-used processes in which the copolymer is dissolved in tetrahydrofuran, acetone, cyclohexanone, or a mixture of these solvents prior to the start of the alcoholysis reaction. When the alcoholysis of vinyl chloride/vinyl acetate copolymers is carried out in suspension in a lower alkanol rather than in solution, there is an appreciable reduction in the cost of the process because resin precipitation and recovery steps and solvent recovery steps are omitted from the process. In addition, the elimination of the use of the aforementioned solvents minimizes the possibility of air pollution and greatly reduces the fire and explosion hazards. A further advantage is that higher concentrations of the copolymer can be employed in the heterogeneous system than in the previously-used homogeneous systems. Up to about 60 percent and preferably 25 to 40 percent by weight of copolymer may be present in the alkanol suspension, whereas the maximum concentration of copolymer that can be present in a solution system is about 25 percent by weight.

Of particular importance is the fact that the particles of the vinyl chloride/vinyl alcohol copolymer are in most cases approximately the same size as those of the copolymer used as the starting material. In those cases where aggregation occurs, the aggregates can be readily broken into particles of the size of the particles that originally formed the dispersed phase of the suspension. This retention of the particle size distribution during alcoholysis is desirable since the products can be used with little or no further size reduction in the preparation of resin dispersions and plastisols.

In a preferred embodiment of this invention, a vinyl chloride copolymer that contains from about 5 percent to 35 percent, and preferably 10 percent to 25 percent, of vinyl acetate and that has an average particle size in the range of about 0.1 micron to 10 microns or from 50 microns to 500 microns, depending on the particle size and type of vinyl chloride copolymer alcoholyzed, is added to a mixture of a lower alkanol and a strong acid catalyst, for example, a mixture of methanol and concentrated sulfuric acid, to form a suspension. The suspension generally contains about 100 parts to 200 parts by weight of the alkanol per 100 parts by weight of the copolymer. The concentration of the acid catalyst in the suspension determines to a large extent the degree to which the alcoholysis takes place. When only partial alcoholysis of the acetate groups to alcohol groups is desired, about 15 parts to 40 parts by weight of the acid catalyst is used per 100 parts by weight of the copolymer; when substantially complete alcoholysis is desired about 40 parts to 100 parts by weight of the acid catalyst is used per 100 parts by weight of the copolymer.

The suspension of the vinyl chloride/vinyl acetate copolymer in the alkanol-acid catalyst mixture is heated at a temperature in the range of about 50° C. to 100° C., and preferably 65° C. to 75° C., until the desired degree of alcoholysis of the vinyl acetate portions of the polymer molecule has taken place. The alcoholyzed copolymer is separated from the unreacted alkanol and then treated with an alkali metal, alkaline earth metal, or ammonium hydroxide, oxide, or carbonate to neutralize the acid that is present in it. If desired, the neutralized copolymer may be washed with dilute acid to remove the last traces of the neutralizing agent before it is washed with water and dried. Products having excellent heat stability are obtained when the alcoholyzed copolymer is neutralized with an aqueous suspension of calcium hydroxide, washed with dilute hydrochloric acid and then demineralized water, and dried. The products obtained using this suspension process generally have an average particle size in the range of about 0.1 micron to 10 microns or from 50 microns to 500 microns, depending on the particle size and type of vinyl chloride copolymer alcoholyzed.

The invention is further illustrated by the examples that follow. In these examples all parts and percentages are parts by weight and percentages by weight.

EXAMPLE 1

To a mixture of 150 parts of methanol and 87.6 parts of concentrated sulfuric acid was gradually added 100 parts of a vinyl chloride/vinyl acetate plastisol resin that contained about 90 percent of vinyl chloride (Resin P 10/65). The resulting suspension was stirred and heated at its reflux temperateure (68° C.) for 12 hours, cool to room temperature and filtered. The alcoholyzed resin was neutralized with an aqueous suspension of calcium hydroxide and then treated with dilute hydrochloric acid at 42–44° C. for two hours to remove unreacted calcium hydroxide. The resin was washed with demineralized water and dried at 45° C. Infrared analysis indicated that the conversion of the acetate groups to alcohol groups was 86.0 percent.

EXAMPLE 2

To a mixture of 150 parts of methanol and 29.2 parts of concentrated sulfuric acid was gradually added 100 parts of a vinyl chloride/vinyl acetate plastisol resin (Resin P 10/65). The resulting suspension was stirred and heated at its reflux temperature for twelve hours, and filtered. The alcoholyzed resin was neutralized with an aqueous ammonium hydroxide solution, washed with demineralized water, and dried at 45° C. The degree of conversion of acetate groups to alcohol groups was 73.0 percent, as determined by infrared analysis.

EXAMPLE 3

To a mixture of 150 parts of methanol and 21.9 parts of concentrated sulfuric acid was gradually added 100 parts of a vinyl chloride/vinyl acetate plastisol resin (Resin P 10/65). The resulting suspension was heated at its reflux temperature for 12 hours, cooled to room temperature, and filtered. The alcoholyzed copolymer was neutralized with an aqueous suspension of calcium hydroxide and then washed with dilute hydrochloric acid to remove unreacted calcium hydroxide. The resin was washed with demineralized water and dried at 45° C. Infrared analysis indicated that 65.5 percent of the acetate groups had been converted to alcohol groups.

The vinyl chloride/vinyl alcohol resins obtained by the procedures of Examples 1-3 had an average particle size of 7-8 microns. These particles were readily ground to the average particle size of the plastisol resin that was used as the starting material in the process (2-3 microns).

EXAMPLE 4

To a mixture of 150 parts of methanol and 43.6 parts of concentrated surfuric acid was gradually added 100 parts of a vinyl chloride/vinyl acetate copolymer that contained about 87 percent of vinyl chloride (Tenneco-315). The resulting suspension was stirred and heated at its reflux temperature for 12 hours, cooled to room temperature, and filtered. The alcoholyzed resin was neutralized with an aqueous suspension of calcium hydroxide and then washed with dilute hydrochloric acid. The product was washed with demineralized water and dried at 45° C. Infrared analysis indicated that 91.7 percent of the acetate groups had been converted to alcohol groups.

EXAMPLE 5

To a mixture of 150 parts of methanol and 51.1 parts of concentrated sulfuric acid was gradually added 100 parts of a vinyl chloride/vinyl acetate copolymer (Tenneco-315). The reaction mixture was stirred and heated at its reflux temperature for 12 hours, cooled to room temperature, and filtered. The alcoholyzed resin was neutralized with an aqueous suspension of calcium hydroxide and then washed with dilute hydrochloric acid. The product was washed with demineralized water and dried at 45° C. Infrared analysis indicated that 94.1 percent of the acetate groups had been converted to alcohol groups.

The terms and expressions that have been employed are used as terms of description and not of limitation. There is no intention in the use of such terms and expressions of excluding any of the features shown or portions thereof. It is recognized that various modifications are possible within the scope of the invention claimed.

What is claimed is:

1. A process for the preparation of vinyl chloride/vinyl alcohol copolymers which comprises heating a vinyl chloride/vinyl acetate copolymer that contains from about 5 percent to 35 percent of vinyl acetate at a temperature in the range of about 50° C. to 100° C. with a strong acid catalyst in a suspension in which the continuous phase consists essentially of an alkanol having from 1 to 3 carbon atoms and said acid catalyst and the dispersed phase consists essentially of said vinyl chloride/vinyl acetate copolymer until the desired degree of alcoholysis has been effected.

2. The process of claim 1 wherein the alkanol is methanol.

3. The process of claim 1 wherein the alkanol is ethanol.

4. The process of claim 1 wherein the strong acid catalyst is sulfuric acid.

5. The process of claim 1 wherein the vinyl chloride/vinyl acetate copolymer that is alcoholyzed contains from about 10 percent to 25 percent of vinyl acetate.

6. The process of claim 1 wherein the vinyl chloride/vinyl acetate copolymer that is alcoholyzed has an average particle size in the range of about 0.1 micron to 10 microns.

7. The process of claim 1 wherein the suspension contains about 25 percent to 40 percent by weight of said copolymer.

8. The process of claim 1 wherein the suspension contains about 15 parts of 100 parts by weight of the acid catalyst per 100 parts by weight of the copolymer.

9. The process of claim 1 wherein the suspension contains 40 parts to 100 parts by weight of sulfuric acid per 100 parts by weight of the copolymer.

10. The process of claim 1 wherein the alcoholyzed copolymer is separated from the suspension medium, treated with calcium hydroxide to neutralize the acid catalyst, and then treated with dilute acid to remove the last traces of calcium hydroxide.

References Cited

UNITED STATES PATENTS

| | | | |
|---|---|---|---|
| 2,478,431 | 8/1949 | Stamatoff | 260—91.3 |
| 2,629,713 | 2/1953 | Goebel | 260—91.3 |
| 3,028,374 | 4/1962 | Ehmann et al. | 260—91.3 |

FOREIGN PATENTS

| | | | |
|---|---|---|---|
| 580,899 | 9/1946 | England | 260—91.3 |

JOSEPH L. SCHOFER, Primary Examiner

S. M. LEVIN, Assistant Examiner

U.S. Cl. X.R.

260—87.5, 91.3PVP